US011125576B2

(12) United States Patent
Eyster et al.

(10) Patent No.: US 11,125,576 B2
(45) Date of Patent: Sep. 21, 2021

(54) FINDING AVAILABLE PARKING SPACES USING COGNITIVE ALGORITHMS

(71) Applicant: International Business Machines Corporation, Armonk, NY (US)

(72) Inventors: Justin D. Eyster, Selinsgrove, PA (US); Avery K. Rowe, Los Angeles, CA (US); Priyanka Sarkar, Austin, TX (US); Christopher E. Whitridge, Gaithersburg, PA (US)

(73) Assignee: International Business Machines Corporation, Armonk, NY (US)

(*) Notice: Subject to any disclaimer, the term of this patent is extended or adjusted under 35 U.S.C. 154(b) by 330 days.

(21) Appl. No.: 15/794,422

(22) Filed: Oct. 26, 2017

(65) Prior Publication Data
US 2018/0313661 A1  Nov. 1, 2018

Related U.S. Application Data

(63) Continuation of application No. 15/499,280, filed on Apr. 27, 2017.

(51) Int. Cl.
 *G01C 21/36* (2006.01)
 *G08G 1/14* (2006.01)
 (Continued)

(52) U.S. Cl.
 CPC ....... *G01C 21/3685* (2013.01); *G01C 21/362* (2013.01); *G01C 21/3617* (2013.01);
 (Continued)

(58) Field of Classification Search
 CPC ........ G06Q 10/02; G01C 21/34; G01C 21/36; G01C 21/3685; G01C 21/3407;
 (Continued)

(56) References Cited

U.S. PATENT DOCUMENTS 5,504,314 A   4/1996 Farmont
6,927,700 B1 * 8/2005 Quinn .................... G08G 1/14
                                              340/468

(Continued)

FOREIGN PATENT DOCUMENTS

WO      2016128056       8/2016

*Primary Examiner* — Luis A Martinez Borrero
(74) *Attorney, Agent, or Firm* — Diana R. Gerhardt; Jack V. Musgrove

(57) ABSTRACT

A mobile computing device such as a smartphone is used to find a parking garage with available spaces for a motor vehicle. The smartphone has a navigation app which receives a destination and computes an estimated time of arrival to that destination. It then broadcasts a request to parking garages in the vicinity of the destination with the ETA. Parking service systems associated with those garages respond with predicted parking availability. A cognitive system analyzes the responses and provides optimal recommendations based on user preferences such as cost, distance and safety. The user selects one of the recommended garages, and the computing device sends a reservation to the selected garage. The navigation app provides first directions to the destination until the vehicle is proximate thereto, and then switches to directions to the garage. The cognitive system can analyze a history of user selections and updating the user's preferences.

6 Claims, 6 Drawing Sheets

(51) Int. Cl.
*H04H 20/55* (2008.01)
*H04W 4/02* (2018.01)
*H04M 1/02* (2006.01)
*G01C 21/34* (2006.01)
*H04W 4/024* (2018.01)

(52) U.S. Cl.
CPC .............. *G08G 1/144* (2013.01); *H04H 20/55* (2013.01); *H04M 1/0202* (2013.01); *H04W 4/023* (2013.01); *G01C 21/3461* (2013.01); *G01C 21/3484* (2013.01); *H04M 2250/10* (2013.01); *H04W 4/024* (2018.02)

(58) Field of Classification Search
CPC .............. G01C 21/3617; G01C 21/362; G01C 21/3608; H04M 1/0202; H04M 2203/403; H04W 4/023; H04W 4/024; H04W 4/021; G08G 1/144; H04H 20/55
See application file for complete search history.

(56) References Cited

U.S. PATENT DOCUMENTS

| | | | |
|---|---|---|---|
| 7,834,778 B2 | 11/2010 | Browne et al. | |
| 8,306,734 B2* | 11/2012 | Mathews | G01C 21/3685 701/408 |
| 8,484,151 B1* | 7/2013 | Lookingbill | G06N 20/00 706/46 |
| 8,589,065 B2* | 11/2013 | Scofield | G01C 21/3685 701/400 |
| 8,610,597 B2* | 12/2013 | Stefik | G06Q 10/02 340/932.2 |
| 8,791,838 B2* | 7/2014 | Scofield | G08G 1/096866 340/932.2 |
| 8,816,880 B1* | 8/2014 | Foster | G08G 1/146 340/932.2 |
| 8,994,560 B2* | 3/2015 | Anderson | G08G 1/202 340/932.2 |
| 9,299,256 B2 | 3/2016 | Chen et al. | |
| 9,299,258 B1* | 3/2016 | Foster | G08G 1/146 |
| 9,652,986 B2* | 5/2017 | Belzner | G08G 1/14 |
| 9,666,074 B2* | 5/2017 | Nicoll | G08G 1/143 |
| 9,747,797 B1* | 8/2017 | Ghosh | G08G 1/143 |
| 9,759,569 B2* | 9/2017 | Trum | G08G 1/141 |
| 9,761,139 B2* | 9/2017 | Acker, Jr. | G08G 1/143 |
| 9,810,542 B2* | 11/2017 | Mays | G01C 21/3685 |
| 10,276,170 B2 | 4/2019 | Gruber | G06F 16/9537 |
| 10,458,809 B2* | 10/2019 | Flores | G08G 1/0969 |
| 2003/0083807 A1 | 5/2003 | Kuroda et al. | |
| 2008/0033769 A1* | 2/2008 | Koorapati | G06Q 10/02 705/5 |
| 2008/0048885 A1* | 2/2008 | Quinn | G08G 1/0141 340/932.2 |
| 2011/0140922 A1 | 6/2011 | Levy et al. | |
| 2011/0224899 A1* | 9/2011 | Mathews | G01C 21/3685 701/533 |
| 2012/0265434 A1 | 10/2012 | Woodard et al. | |
| 2013/0176147 A1* | 7/2013 | Anderson | G08G 1/202 340/932.2 |
| 2013/0226915 A1* | 8/2013 | Scofield | G06Q 30/0261 707/724 |
| 2013/0265174 A1 | 10/2013 | Scofield et al. | |
| 2013/0268187 A1* | 10/2013 | Scofield | G01C 21/3685 701/400 |
| 2015/0066545 A1* | 3/2015 | Kotecha | G08G 1/148 705/5 |
| 2016/0019790 A1 | 1/2016 | Tobolski et al. | |
| 2016/0117925 A1 | 4/2016 | Akavaram et al. | |
| 2017/0191849 A1* | 7/2017 | Agam | G08G 1/0112 |
| 2017/0234694 A1* | 8/2017 | Flores | G08G 1/143 701/428 |
| 2018/0053417 A1* | 2/2018 | Rolf | G08G 1/143 |
| 2018/0218604 A1* | 8/2018 | Astigarraga | G06K 9/00812 |
| 2018/0253715 A1* | 9/2018 | Loeffler | G01C 21/3697 |
| 2018/0313660 A1* | 11/2018 | Eyster | G01C 21/3685 |
| 2018/0313661 A1* | 11/2018 | Eyster | G08G 1/144 |

* cited by examiner

FINDING AVAILABLE PARKING SPACES USING COGNITIVE ALGORITHMS

CROSS-REFERENCE TO RELATED APPLICATION

This application is a continuation of copending U.S. patent application Ser. No. 15/499,280 filed Apr. 27, 2017, which is hereby incorporated.

BACKGROUND OF THE INVENTION

Field of the Invention

The present invention generally relates to transit, and more particularly to a method of finding a parking space for a motor vehicle.

Description of the Related Art

Anyone who drives a motor vehicle understands how difficult it can be to find a good parking space, or any parking space at all. Many times a driver finds a suitable spot right after he passes it, and has to circle back to it, and then sometimes someone else has just taken it. Parking areas can often be crowded because many drivers want the same spot, and the need to circle back along with the crowdedness of parking areas make them a common place for car accidents. A number of approaches to these problems have been suggested.

U.S. Pat. No. 5,504,314 discloses a system that monitors available parking spaces by providing communicators which detect parking tickets, with each communicator having a detection region directed towards an associated parking space. Controlled ingress/egress allows the system to know exactly which spaces are available.

U.S. Pat. No. 7,834,778 illustrates a parking space locator that stores geographical locations of available parking spaces in a database. When a requestor sends the location of his vehicle, the database provides a geographic indicator of an available parking space within a proximity of the vehicle location.

U.S. Pat. No. 9,299,256 relates to a real-time parking assistant for communicating parking space availability at a selected parking facility. The parking space availability is determined as a function of crowd sourcing data, historical parking data, parking availability data of parking facilities proximate to the selected parking facility, and direct sensed parking spaces.

U.S. Patent Application Publication No. 2011/0140922 describes a system for identifying parking spaces for a community of users. The system uses the global positioning system (GPS) capability of a mobile phone to notify drivers when another car has moved away from a parking spot.

U.S. Patent Application Publication No. 2012/0265434 shows a system for identifying parking spots. A server knows the location and status of parking spots and communicates the information to a mobile device with a time estimate of how long the spot will remain open.

U.S. Patent Application Publication No. 2016/0019790 is directed to a parking service that can determine a proximity of a host vehicle to a target location. When the proximity to the target location is less than a predetermined value, the service transmits the target location to a parking server, and the parking server sends a message identifying a parking zone.

U.S. Patent Application Publication No. 2016/0117925 discloses an intelligent parking space identification and notification system. The system identifies available parking spaces and selects a preferred parking space based upon a comparison of dynamic parking space properties to factors such as driver skill data or vehicle properties.

Patent Cooperation Treaty Application no. WO 2016/128056 illustrates a method for finding a free parking space for a car or the like. A trade-off is setup between a time for searching for a free parking space and a distance of the parking space to a selected destination. An optimal route is then calculated based on a probabilistic parking space model.

SUMMARY OF THE INVENTION

The present invention in at least one embodiment is generally directed to a method of finding a parking space for a motor vehicle by receiving a destination in a mobile computing device, determining a current location of the mobile computing device, receiving an estimated arrival time for travel from the current location to the destination in the mobile computing device, receiving a plurality of parking locations proximate the destination in the mobile computing device wherein each parking location has multiple parking spaces and an associated parking service system, transmitting a request for parking availability with the estimated arrival time from the mobile computing device to a plurality of the parking service systems, receiving one or more responses from the plurality of parking service systems wherein each response includes predicted parking availability for the estimated arrival time at one of the associated parking locations, and receiving a selection of one of the parking locations whose corresponding response indicates an available parking space from the predicted parking availability. The mobile computing device can include global positioning system functionality so the current location can be determined by computing geographic coordinates using the global positioning system functionality. In some embodiments the invention provides first travel directions from the current location to the destination using the mobile computing device, dynamically determines that the mobile computing device is within a predefined proximity of the destination, and then responsively provides second travel directions from the current location to the selected parking location. The request for parking availability can include one or more user preferences, and the responses from the plurality of parking service systems can be analyzed using a cognitive system based on the one or more user preferences to derive a recommendation score for each of the responses. The user preferences may for example be parking cost, distance to the destination, and safety. A history of requests of a user can be analyzed using the cognitive system to update the user preferences. A reservation can be transmitted from the mobile computing device to the parking service system associated with the selected parking location.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED
EMBODIMENT(S)

Although several approaches have been devised to assist drivers in finding a parking space, there are still many problems and shortcomings. Some of these approaches require one driver informing another that he is exiting a parking location, which is both burdensome and sporadic. Other inventions in this area require users to select the parking space they wish to use, and then they are relayed the status of the spot (whether it is occupied or not), possibly with a time estimation of how long the spot will remain unoccupied. These inventions use location sensors in the car to detect if it is moving or not, and infers whether the spot it occupied is empty or not, respectively, so can be unreliable. Even when a driver does find a spot, she cannot guarantee that there is not a cheaper, safer, or closer spot to her destination.

It would, therefore, be desirable to devise an improved method of finding a parking spot for a motor vehicle which could provide optimal suggestions without imposing onerous burdens on users or other drivers. It would be further advantageous if the method could be customized for different users. The present invention in various embodiments achieves these and other objectives by allowing a parking garage to electronically advertise available parking spaces or respond to a vehicle request for parking spaces. The invention can notify drivers as they approach their destination of clear spots using communication between garages and the driver's vehicle or a mobile computing device such as a smartphone. A parking management system can suggest parking garages tailored to a drivers' preferences (most cheap, most safe, etc.), and can only suggest garages with many spots so that the probability is high that the driver will get a space. It can also notify the driver of these garages in advance, when the driver is a predefined time or distance away from her location, so that it is impossible for the driver to pass and have to circle back to the spot. The invention is particularly useful in helping people locate free parking spaces.

Figure 1:
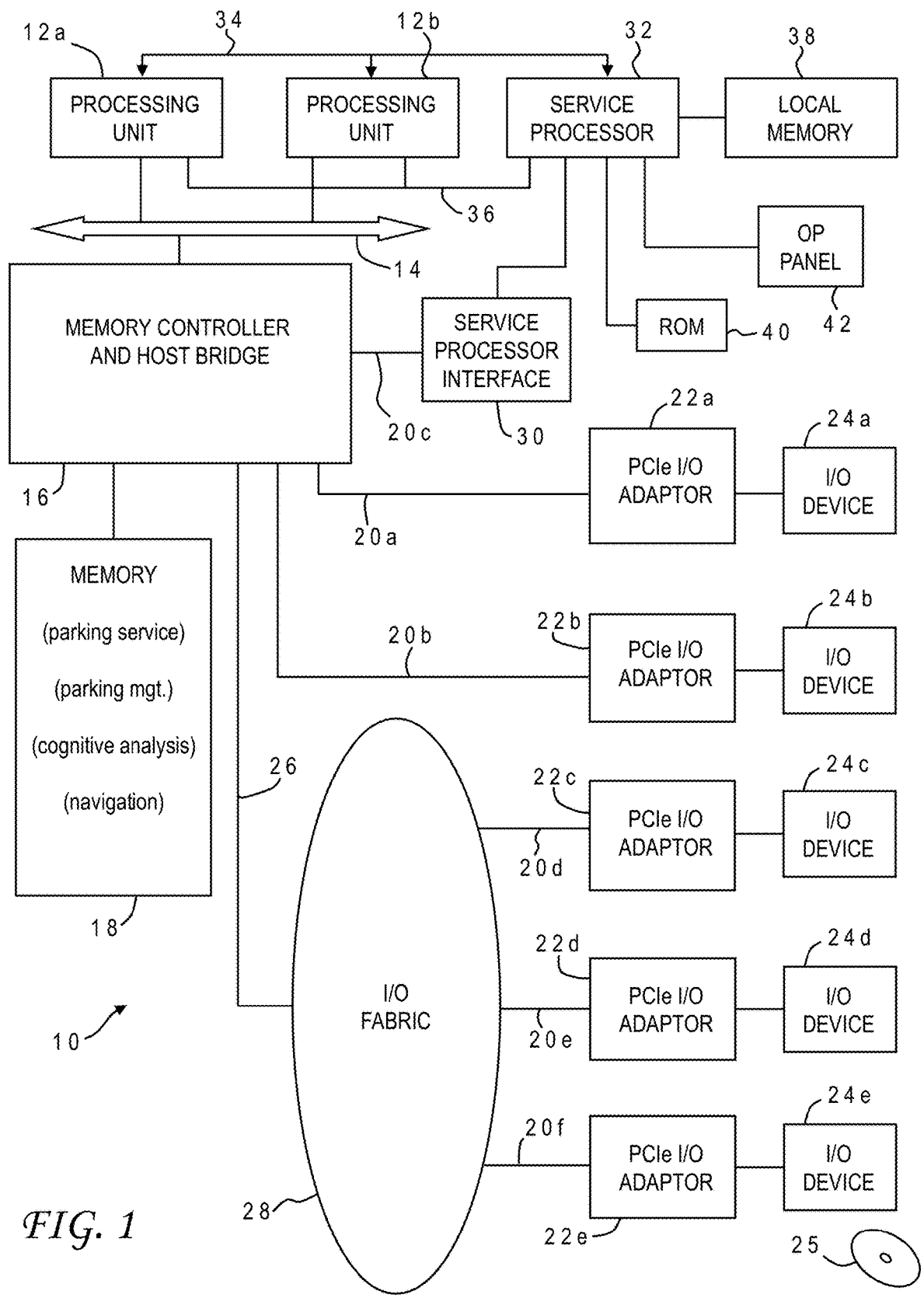
FIG. 1 is a block diagram of a computer system programmed to carry out various functions such as cognitive analysis or navigation in accordance with one implementation of the present invention.

With reference now to the figures, and in particular with reference to FIG. 1, there is depicted one embodiment 10 of a computer system in which the present invention may be implemented to carry out various functions such as cognitive analysis of a user's parking preferences or navigational aid. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention such as the cognitive analysis or navigation.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed.

Executable code is loaded into memory 18 and service processor 32 releases host processors 12a, 12b for execution of the program code, e.g., an operating system (OS) which is used to launch applications and in particular the applications of the present invention, results of which may be stored in a hard disk drive of the system (an I/O device 24), or delivered to a mobile computing device via a network interface (another I/O device 24), e.g., to the Internet. While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

Computer system 10 carries out program instructions for various processes to enable the analysis and/or navigation techniques as disclosed herein. Accordingly, a program embodying the invention may include conventional aspects of various deep-learning or navigational tools, and these details will become apparent to those skilled in the art upon reference to this disclosure.

Figure 2:
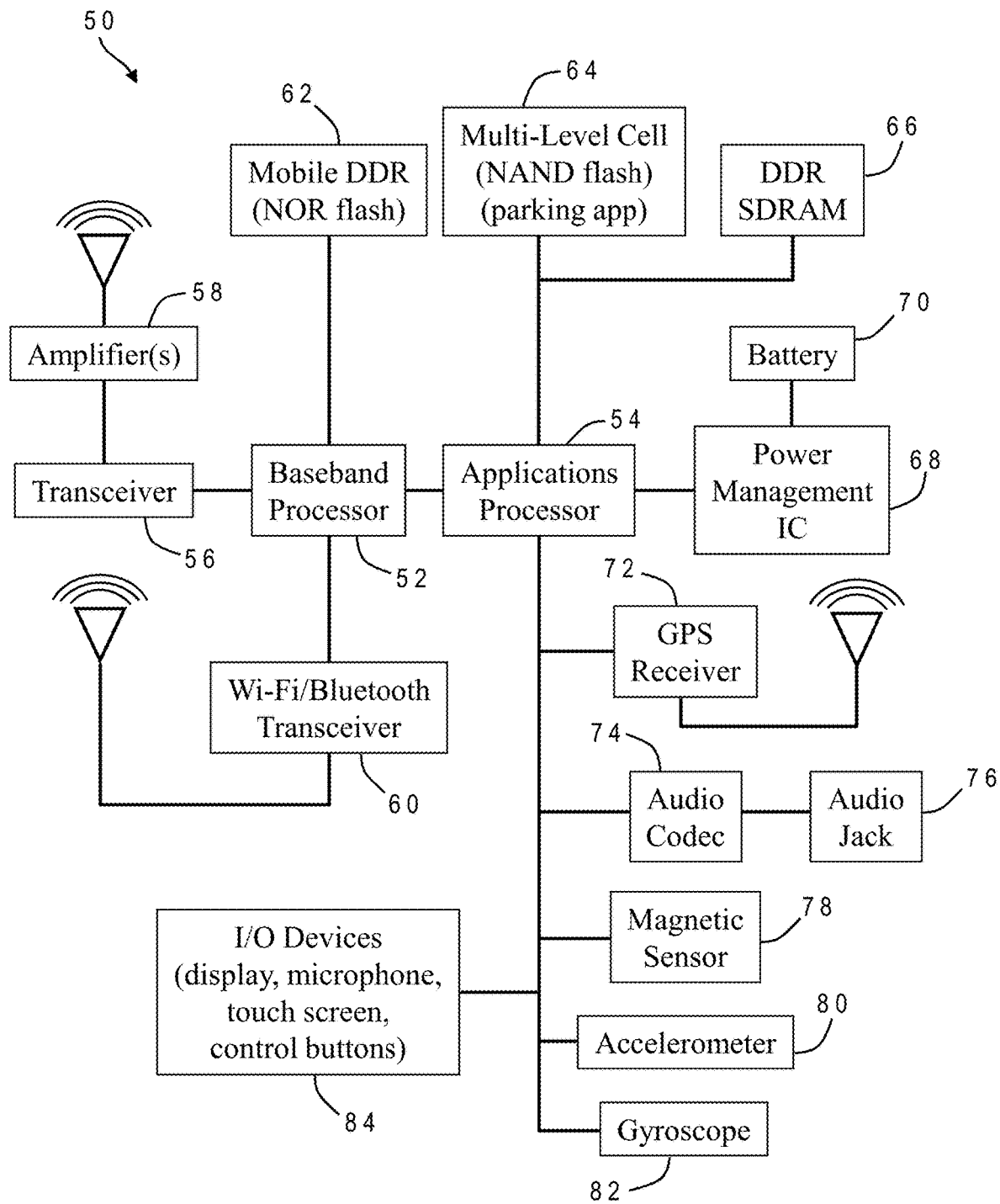
FIG. 2 is a block diagram of a mobile computing device (e.g., smartphone) programmed to carry out parking space management in accordance with one implementation of the present invention.

Referring now to FIG. 2, there is depicted one example 50 of a mobile computing device or smartphone in which embodiments of the present invention may be implemented to carry out parking space management by the user. As with computer system 10, alternative embodiments of smartphone 50 may include modifications of the hardware components or their interconnections, or additional components, and other mobile computing devices may be used besides smartphones such as tablets, notebooks or laptop computers, so the depicted example should not be construed as implying any architectural limitations with respect to the present invention. The mobile computing device can also be a vehicle itself having a computerized interface. In this example smartphone 50 includes a baseband processor 52 and an applications processor 54. Baseband processor 52 manages most of the radio (wireless communications) functions of smartphone 50, including communication with a wireless service provider (including Internet transmissions) via a transceiver 56 which is connected by one or more power amplifiers 58 to a network antenna. Baseband processor can also control Wi-Fi and Bluetooth transmissions through transceiver 60 connected to a local antenna. Baseband processor 52 uses a dedicated mobile DDR memory (NOR flash) 62.

Baseband processor 52 essentially acts as an input/output (I/O) device with respect to applications processor 54 which executes the software programs (apps) embodying the invention. Those applications may include one or more programs that can also be carried out by computer system 10. Applications processor 54 preferably utilizes multi-level cell memory (NAND flash) 64 and DDR synchronous dynamic random-access memory (SDRAM) 66. In particular, NAND flash 64 may store a parking space management application of the present invention. Applications processor 54 can interact with a power management integrated circuit 68 to control the power supply (battery) 70. Applications processor 54 can additionally receive inputs from a variety of peripheral devices such as a global positioning system (GPS) receiver 72 connected to a GPS antenna, an audio codec 74 which drives an audio (e.g., headphone) jack 76, a magnetic sensor 78 for azimuthal indication, an accelerometer 80 for crash detection and prevention, a 3-axis gyroscope 82 for orientation indication, and user I/O devices 84 (e.g., touch screen/display, microphone and control buttons). Smartphone 50 may include many other hardware features not illustrated, for example, a camera and associated driver circuitry.

When smartphone 50 is first turned on, baseband processor 52 and applications processor 54 may perform various tests such as built-in-self-tests or memory tests on the memory components 62, 64, 66. If the systems pass the tests then each processor begins execution of its primary code, namely, a communications link for baseband processor 52 and an operating system for applications processor 54. Once the network communications have been established by baseband processor 52 and the operating system is loaded by applications processor 54, the user can enter appropriate commands via the touch screen or microphone to load executable code representing embodiments of the present invention for execution by applications processor 54.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
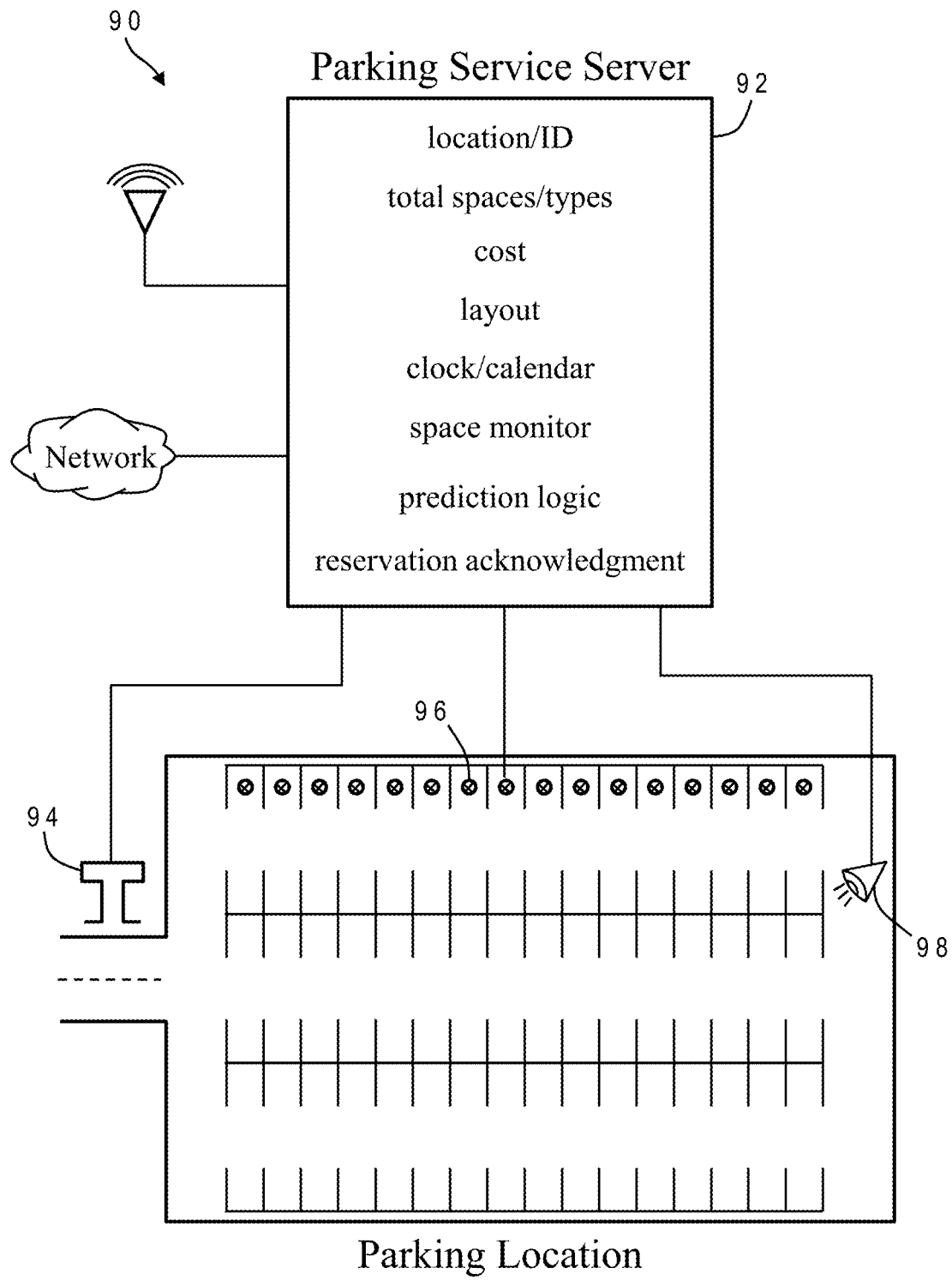
FIG. 3 is a pictorial representation of a parking service server associated with a parking location such as a garage or parking lot in accordance with one implementation of the present invention.

Different aspects of the invention can be implemented in different systems which can be in direct communication with one another or communicate through a network such as the Internet. In an alternative embodiment, these diverse systems can be consolidated into a single computer system. These systems may for example include the mobile computing device used by the driver, a remote parking management server which can use cognitive analysis to provide parking location suggestions and advanced navigational assistance, and parking service servers associated with respective parking locations. An illustrative implementation of a parking service system 90 is seen in FIG. 3. Parking service system 90 includes a parking service server 92 which may be a computer system such as computer system 10 with server functionality (responding to client requests). Parking service server 92 can communicate with other systems using for example an antenna for radio communications or a wired connection to a network such as the Internet. Parking service server 92 may be remote from, or co-located with, the parking location.

Parking service server 92 may have various inputs which allow data gathering regarding parking availability at an associated parking location or parking garage. The term "parking garage" as used herein is not limited to any particular type of facility and may for example include public or private locations, open air lots, enclosed structures, or simply a collection of parking spaces along one side of a street with one or more parking meters. In this example the data gathering features include one or more parking kiosks or booths 94 located at an entry/exit of the parking facility, a plurality of sensors 96, and one or more cameras 98.

A parking kiosk 94 can operate as a ticket dispenser as well as a pay station, or may be limited to only one of these functions. There may be multiple parking kiosks, e.g., located at different points of ingress/egress, on opposite sides of a street, etc. Tickets may be provided for general parking at the facility or for a specific parking spot (or for a specific user). Tickets can have an embedded marker to identify information such as the intended parking space, time of entry, etc. In advanced embodiments the parking ticket can be sensed by in-ground sensors (e.g., active resonant transceivers) or be detected via multiple electromagnetic sensors which determine the location of the ticket using triangulation. The unavailability of a parking space can thus be inferred by the detected presence of a ticket in a corresponding space. Parking spaces may be of different types, such as general parking, compact car parking, disabled parking, hybrid or electric car parking, parallel parking, reverse parking, car versus motorcycle, etc. Parking kiosk 94 can provide information to parking service server 92 regarding the particulars of dispensed tickets as well as exiting tickets to infer further parking space availability, i.e., decrementing a number of available spaces each time a ticket is dispensed and incrementing the number each time a vehicle leaves the garage.

Sensors 96 may be conventional in design and use various techniques such as electromagnetic detection or echo location to determine when a vehicle is parked directly over the sensor or in such close proximity so it may be inferred that a vehicle is parked in the corresponding space. Sensors 96 could also be able to detect ticket markers described above. Each sensor may have a respective connection to parking service server 92, or a central control device located at the parking garage can gather information from multiple sensors and feed the collected data to parking service server 92. Sensors 96 need not be at all parking spots; for example, in a parking garage with many permanently "reserved" parking spaces, sensors 96 might only be provided for non-reserved spaces. In such an implementation, reserved spaces can always be considered unavailable, now and in the future.

Camera 98 is also conventional in design. A single camera may be used which pans the parking area or provides a bird's eye view from directly above the lot, or multiple cameras may be used as necessary to monitor all parking spaces which might be considered available. Camera 98 can provide a direct video feed to parking service server 92 which can use various means such as a convolutional neural network to identify cars and their corresponding locations. Alternatively, a local control module at the parking garage may have this functionality, and provide the collected data (indicating currently available spaces) to parking service server 92. Any of the data from the inputs 94, 96, 98 can be provided directly to parking service server 92 or through intermediaries such as a virtual private network using the Internet.

Other conventional means can be utilized to determine parking garage usage, such as that described in U.S. Patent Application Publication No. 2011/0140922 wherein a user notifies other drivers when their car has moved away from a parking spot.

Parking service server 92 includes a computer-readable representation for the layout of the parking garage, and a space monitor which reads this layout and takes the data from the various parking location inputs to determine which spaces (general or specific) are currently available. This information can be provided in raw form to parking space requestors, either directly via the antenna or through the network interface. More preferably, parking service server 92 includes prediction logic which provides an estimate for the total number of parking spaces that will be available at a certain time or time window (i.e., an arrival time of a vehicle). The estimate may alternatively be for a particular type of parking space the requestor is looking for, such as a space having an electrical supply connection for a hybrid car, or a space with an associated cost tier. The parking prediction logic can use cognitive algorithms carried out by a deep thought system such as a neural network, and may rely on images from camera 98. The system can be manually configured to note in a database any portions of the image field which should be cropped in order to better isolate each individual parking space. The exact GPS location of each parking space can also be stored in the database. The database can further store various information about the parking space that would pertain to individual user's needs/preferences (cost, handicap accessibility, oversized vehicles/trailers, parallel parking, etc.). Using images sampled from this system, the neural network is trained to distinguish between open and occupied parking spaces. The system can thus continuously check availability by taking a photo, cropping the image to isolate each individual parking space, and feeding these photos into the trained neural network to determine which are free or occupied. If a user's destination is near a given parking area, the system determines which (if any) of the open spaces is most convenient for the user, and sends the exact GPS coordinate of that parking space to the user's cell phone.

Historical data collected using these methods could then be used to predict future parking availability. This way, the user is led towards parking with the highest likelihood of being available by the time the user gets there. Directions will automatically update if the parking space becomes occupied before the user arrives at the parking location. Parking prediction can be based on a variety of factors, including general historical usage for that parking location (day of the week, time of day, etc.), users' specific histories (e.g., a particular user is using a space right now but typically uses a space for no more than thirty minutes once a day), holidays, special events nearby, or reservations that may have already been made for a space. To this end parking service server 92 may include a clock and a calendar system. Thus, when parking service server 92 receives a request for parking space availability (from a vehicle driver or a parking management server), it can provide a response with relevant information including the location (e.g., address) of the facility, and predicted available spaces with associated costs. In lieu of the location information, parking service server 92 can provide a parking location identifier which the requestor can automatically associate with a specific location by means of predefined locations having corresponding identifiers. If a requestor decides to select a particular spot at that parking location, the requestor can send a reservation request for that spot to parking service server 92 which can in turn send a reservation acknowledgment back to the requestor, and mark that spot as reserved for the internal space monitor and prediction logic. While the various functions carried out by parking service server 92 are illustrated as being co-located, those skilled in the art will appreciate that these functions can be distributed across different computing systems.

Figure 4:
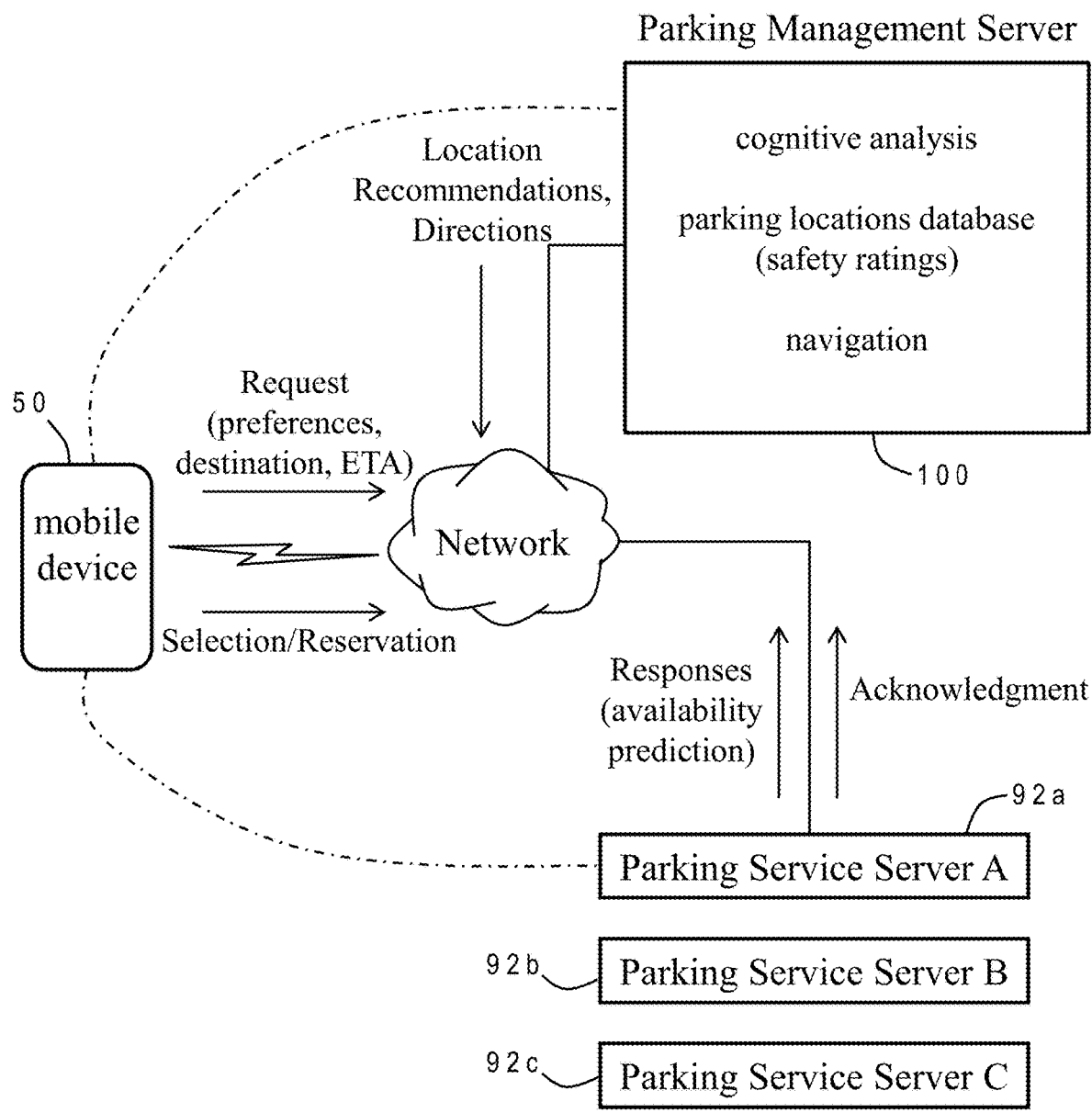
FIG. 4 is a pictorial representation of interactions between a mobile computing device such as a smartphone, a parking management server, and one or more parking service servers in accordance with one implementation of the present invention.

FIG. 4 illustrates possible interactions between a mobile computing device 50 (e.g., smartphone), a parking management server 100, and one or more parking service servers 92*a*, 92*b*, 92*c* in accordance with one implementation of the present invention. The interactions begin with a request that is sent from mobile computing device 50 for parking space suggestions. This request could be broadcast directly from mobile computing device 50 to any parking service servers 92 in the vicinity (i.e., the operational range of the mobile device antenna), or delivered to parking management server 100 via the Internet, although any or all of the functionalities of parking management server 100 can be incorporated directly into mobile device 50 as computing power and memory storage permit. According to this illustrative implementation, the request at least includes a destination of the user (i.e., driver or vehicle occupant), parking preference criteria, and an estimated time of arrival of the user at the destination.

The request can be constructed within mobile computing device 50 as part of a navigation app loaded on the device.

The destination may be entered by the user as text in an input field of the navigation app, as speech using speech-to-text recognition within mobile computing device 50, or graphically by designating a geographic area using a touch screen on which a map is displayed by the navigation app. The time of arrival can be manually estimated by the user, or computed by the navigation app based on coordinates of the user derived from the GPS functionality of mobile computer device 50 along with known route information to the destination and current traffic conditions. The time of arrival could be "now", i.e., immediately. The request can also contain ancillary information such as some unique identifier for the user, a specific type of parking space required, vehicle information, or intended duration.

The parking preference criteria can be customized by the user. Factors may include among others cost, distance from the parking location to the destination, and the safety in the vicinity of the parking location. Cost may be absolute (dollars and cents) or relative, e.g., low, moderate, or high. Of course, a high cost indicator does not mean an actual preference for high cost but rather a tolerance, and low cost parking spaces can still be included within this cost bracket. Distance from the parking location to the destination can alternatively be expressed as a time for ambulatory travel from the parking location to the destination. Safety would also be entered as a relative value, i.e., high safety versus low, and again a low safety preference would indicate a tolerance as opposed to a preference per se. Each preference may be given a numerical weight based on user input; for example, a user may want high safety more than anything else, particularly cost, so the safety might have a weight of ten while the cost has a weight of one and the distance has a weight of two. Preferences may also be inferred by the navigation app running on mobile computing device 50 or a cognitive system running on parking management server 100 based on historical user information, i.e., the attributes of previous parking space selections.

A request (particularly one that is likely to be repeated many times) can be pre-programmed into mobile computing device 50, and can automatically be broadcast when a location monitor of the navigation app senses that the user is near her destination. This proximity can be set to a default value, or set by the user, as either a radius or Manhattan (route) distance. Thus, as the driver approaches her destination, the navigation app can manage the parking selection process without any contemporaneous action by the user. If multiple pre-programmed destinations are within the proximity designation, the navigation app can spontaneously prompt the user for an indication of which of those destinations, if any, is desired.

Parking service servers 92 can respond directly to mobile computing device 50 with predicted parking information. Alternatively, parking management server 100 can act as an intermediary, receiving the request from mobile computing device 50, determining which parking locations are suitable based on the user's destination (according to predefined proximity criteria which may be wider-ranging that the wireless broadcast range of mobile computing device 50), forwarding the request to each of those parking locations, and collecting responses from the parking service servers 92. Each response preferably includes a predicted parking availability for that garage at the estimated arrival time, and the associated cost for parking the vehicle (which may be based on any indicated duration). The parking availability can be a total number of available spaces, specific spaces that will be available, or simply an indication that at least one space will be available. The response may reflect estimated time of arrival at the parking location rather than the destination per se, and can figure a lead-time into this number, e.g., another ten minutes before the desired ETA at the destination to allow time for parking and walking from the parking lot to the destination.

Parking management server 100 can then evaluate the parking service responses together with the user preferences and other information such as safety ratings using cognitive analysis to arrive at optimal parking suggestions. As noted above, this analysis can alternatively be carried out by the mobile computing device itself. For example, a cognitive algorithm can use cost, number of spots available, distance, and safety to generate a numerical score (e.g., percentage). Safety of the parking location may be determined by a predefined table of manually-entered safety ratings associated with respective locations, or safety ratings determined by other means such as crawling the Internet for reviews of the parking locations, or examining images of parking garages using a convolutional neural network to classify the safety of each location. As noted above, these parameters can each have an associated weight which is used in generating the score. Thus, if a parking location were to provide a response indicating a lowest cost (possibly free) among all the responses, the highest number of available spaces among all the responses, the closest distance to the user destination among all the responses, and the highest safety rating among all the responses, it would be given a score of 100%.

The parking garage with the highest score can be picked as the optimal suggestion and transmitted to mobile computing device 50 by parking management server 100, along with travel directions or other navigational aids which can be presented to the user by the navigation app. Alternatively, multiple parking garages can be offered to the driver in order of decreasing score, for example, the top ten scores/suggestions. Locations (physical addresses) of the suggestions can be stored in mobile computing device 50 for later retrieval by the navigation app. The user can confirm the result of the analysis, or otherwise pick among the possible candidates, again through a user interface of mobile computing device 50 provided by the navigation app (or the navigation app can be set to automatically select the highest score). This selection can be further sent to the corresponding parking service server 92 (directly, or via parking management server 100) as a reservation request, and that parking service server can send a return acknowledgment back to the user and make a notation in its space monitor that one parking spot should now be considered as taken for purposes of future responses. The navigation app can optionally provide directions to the selected parking garage.

A cognitive system constructed in accordance with the present invention can optimally learn driver preferences over time, and adapt its suggestion algorithm. Each time the driver picks a spot, the related information can be used to update the algorithm. For example, if a driver mostly picks spots that have higher safety ratings even though their scores are not optimal, the algorithm can infer that safety should be given more importance and increase the weight of that parameter, or reduce the weight of other parameters.

Figure 5A:
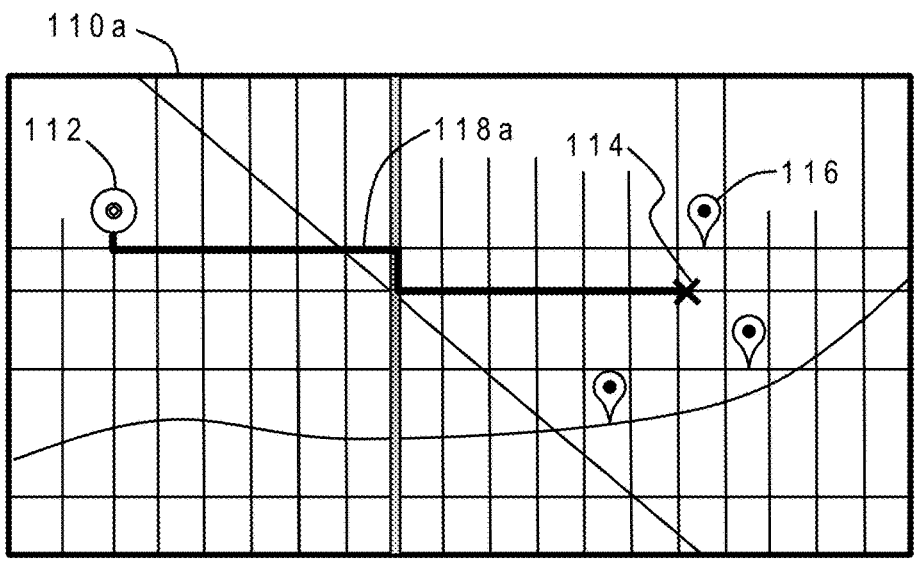
FIGS. 5A, 5B and 5C are plan views of different maps showing how different types of directions can be provided in a navigation app of a mobile computing device in accordance with one implementation of the present invention.
Figure 5B:
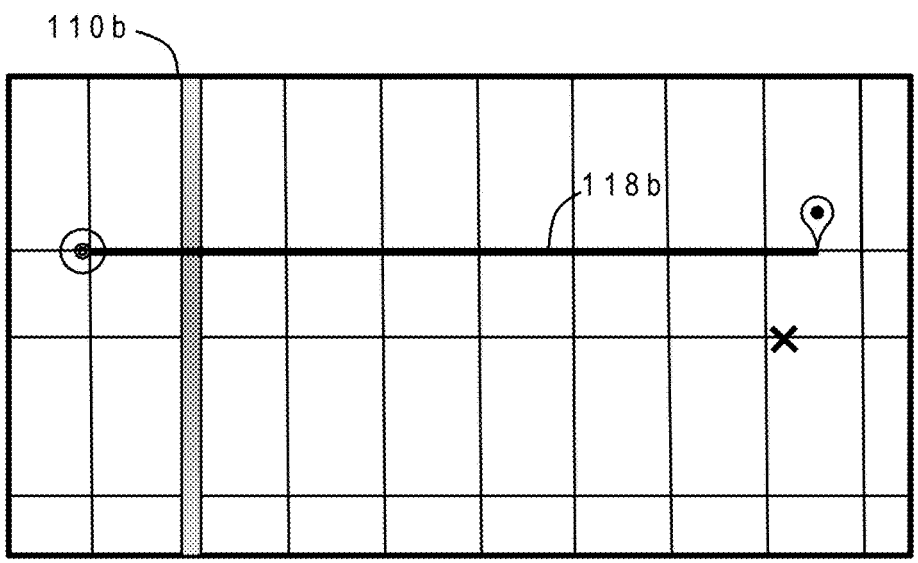
Figure 5C:
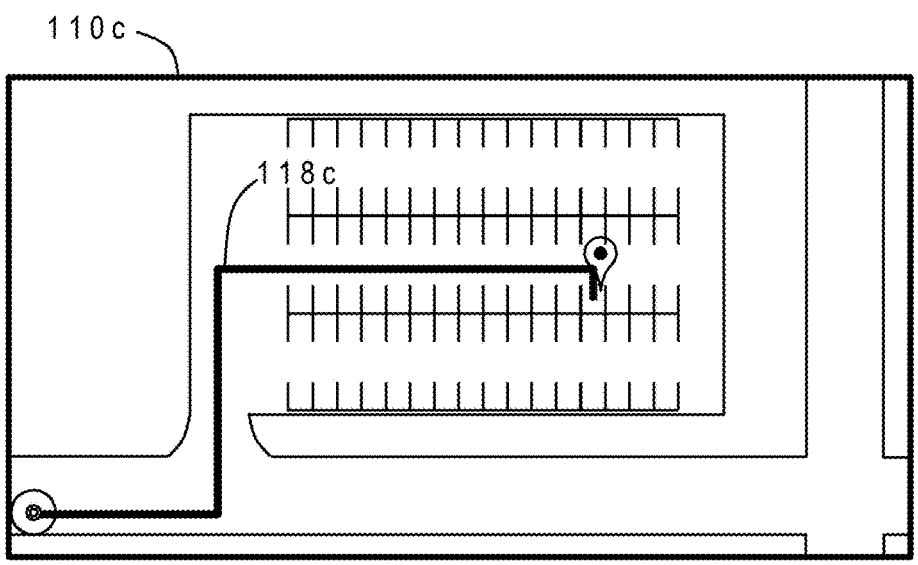

In a preferred implementation of the present invention, the navigational directions provided by the mobile device or parking management server can dynamically change during the process of selecting a particular parking location, as shown in FIGS. 5A-5C which are plan views of images displayed on the screen of mobile computing device 50 by the navigation app. FIG. 5A shows a first map 110*a* having a first icon or marker 112 (in this case, a bullseye target) representing the location of the user/vehicle, a second icon or marker 114 (in this case, an "X") representing the location of the desired destination, and several third icons or markers 116 (in this case, teardrop-shaped targets) representing multiple locations of respective parking garages which have been determined to be proximate the user's destination or otherwise conform to the user's parking preferences, prior to selection of a specific parking garage. A thick line tracing a path along streets from user icon 112 to destination icon 114 provides graphic directions to the user for the recommended route 118a. Other directions may be provided in text or through speech generation sourced by the navigation app.

In this example the user selects the uppermost garage icon (which happens to be the closest to the destination) by touching her finger on the touch screen at this point. Thereafter, as the user is approaching her destination and gets within a predetermined distance of the parking garage, a mechanism of the navigation app will automatically trigger to change the directions, and indicate a new route 118b to the selected parking garage instead of the destination as seen in the map 110b of FIG. 5B. The predetermined distance may be set by the user but a default distance can be provided by the navigational app, such as one mile. The scale of the map also preferably changes. Map 110b can still provide an indication of the destination location.

Finally, when the user arrives at the parking facility (or otherwise enters the location or pays for a parking ticket), the dynamic mechanism of the navigation app triggers again to display a third map 110c of the parking layout with another new route 118c to the specific parking spot in the garage. This exact location of the parked car can be stored for later retrieval in case the user is having trouble finding the car.

Figure 6:
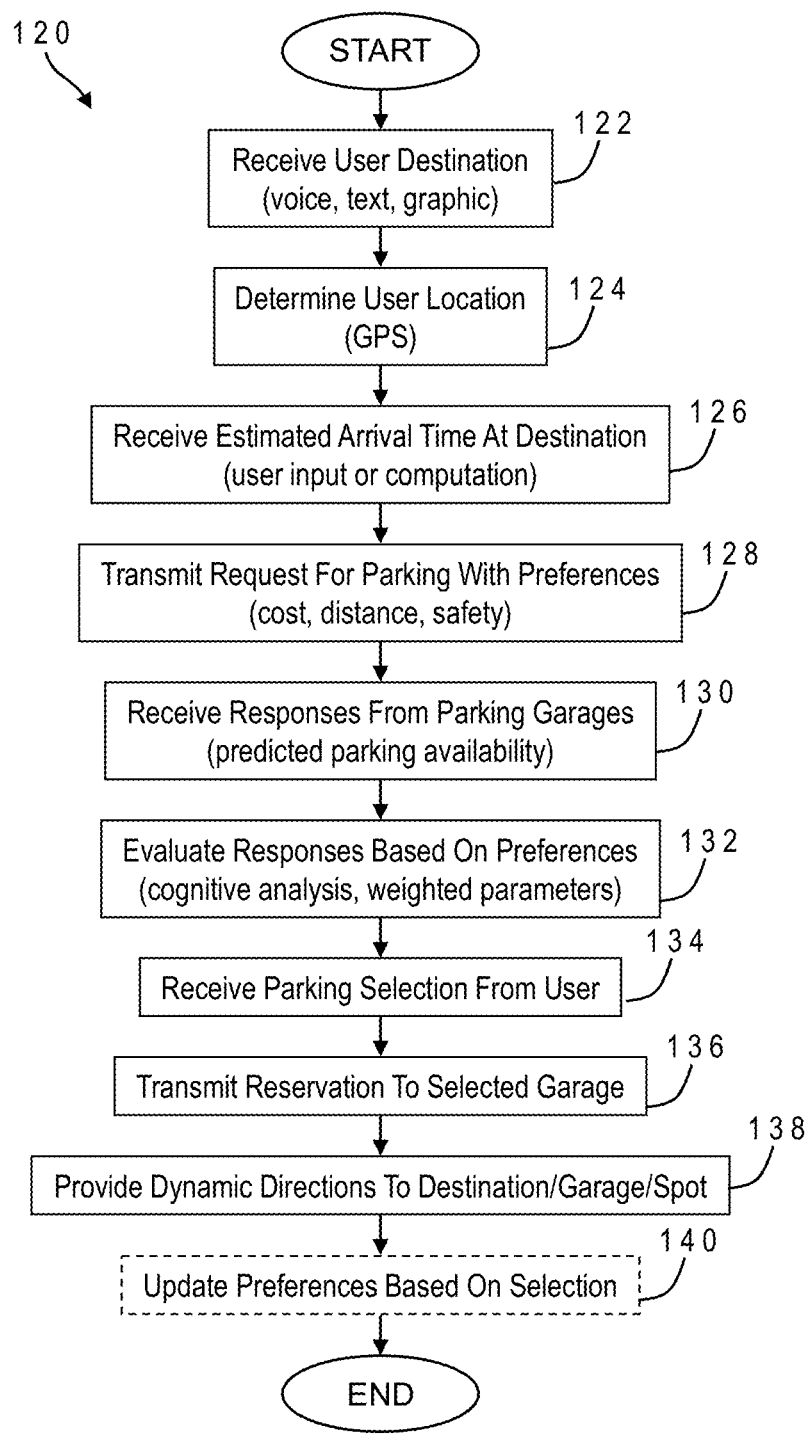
FIG. 6 is a chart illustrating the logical flow for a parking space locating process in accordance with one implementation of the present invention.

The present invention may be further understood with reference to the chart of FIG. 6 which illustrates the logical flow for a parking space location process 120 in accordance with one implementation of the present invention. Process 120 begins when the mobile computing device or other computer system receives a proposed destination from a user (122). The computing device uses its GPS functionality to determine the user's current location (124), and receives or computes an estimated arrival time of the user at the destination (126). The computing device transmits a request for parking with relevant information, including user preferences such as cost, distance and safety (128). The computing device then receives responses from area parking garages with predicted parking availability for the estimated time of arrival (130). Those responses are evaluated by the cognitive system, based on preferences and other parameters which may have different weightings (132), to result in one or more parking space recommendations. The computing device then receives the user's selection of a particular garage (134), and responsively transmits a reservation request to that garage (136). A navigation app in the computing device finishes the primary process by providing directions to the destination, the garage, and the individual parking space (138). The cognitive system can optionally update this user's preferences based on any attributes of this latest selection (140).

The present invention in its various embodiments thereby overcomes many of the problems and shortcomings of the prior art. This invention can suggest parking garages tailored to a drivers' preferences (most cheap, most safe, etc.), and can suggest only garages with many spots so that the probability is high that the driver will get a space. Also it can notify the driver of these garages, when the driver is a predefined time or distance away from her location, so that it is impossible for the driver to pass and have to circle back to the spot. The invention can additionally display metrics, such as the cost of parking and the number of available spots, and automatically suggest the best parking garage for the user based on her parking habits. A person visiting a new city would normally have no idea where the "best" parking spaces are, but with this application he or she can find parking without having to be familiar with the city. If a person wants to park but is particularly interested in spaces that are cheap, in safe neighborhoods, or meet some other criteria, this application will find them because it can include an algorithm that constantly learns and updates with the user's preferences. The application can reduce the number of accidents, because many accidents actually occur in parking lots as people are not paying attention and too many cars are aiming for the same spot. This application will only suggest spots that the driver is almost guaranteed to get, so that means the driver can focus more on driving and not compete with other drivers. By making it easier for people to find parking, there may be more people using parking garages, which can also increase a city's revenue.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of finding a parking space for a motor vehicle comprising:
   receiving a destination in a mobile computing device;
   determining a current location of the mobile computing device;
   receiving an estimated arrival time for travel from the current location to the destination in the mobile computing device;
   receiving a plurality of parking locations proximate the destination in the mobile computing device wherein each parking location has multiple parking spaces and an associated parking service system;
   transmitting a request for parking availability with the estimated arrival time from the mobile computing device to a plurality of the parking service systems wherein the request for parking availability includes one or more user preferences;
   receiving one or more responses from the plurality of parking service systems wherein each response includes predicted parking availability for the estimated arrival time at one of the associated parking locations;
   analyzing the responses from the plurality of parking service systems using a cognitive system based on the one or more user preferences to derive a recommendation score for each of the responses; and
   receiving a selection of one of the parking locations whose corresponding response indicates an available parking space from the predicted parking availability.

2. The method of claim 1 wherein the mobile computing device includes global positioning system functionality and said determining is performed by computing geographic coordinates using the global positioning system functionality.

3. The method of claim 1 further comprising: providing first travel directions from the current location to the destination using the mobile computing device; dynamically determining that the mobile computing device is within a predefined proximity of the destination; and responsive to said dynamically determining, providing second travel directions from the current location to the selected parking location.

4. The method of claim 1 wherein the user preferences include parking cost, distance to the destination, and safety.

5. The method of claim 1 further comprising analyzing a history of requests of a user using the cognitive system and updating the user preferences.

6. The method of claim 1 further comprising transmitting a reservation from the mobile computing device to the parking service system associated with the selected parking location.

* * * * *